US007298780B2

(12) United States Patent
Zhengdi et al.

(10) Patent No.: US 7,298,780 B2
(45) Date of Patent: Nov. 20, 2007

(54) MULTIPLE ACCESS USING DIFFERENT CODES LENGTHS FOR GLOBAL NAVIGATION SATELLITE SYSTEMS

(75) Inventors: Qin Zhengdi, Tampere (FI); Seppo Turunen, Tampere (FI)

(73) Assignee: Nokia Corporation, Espoo (FI)

( * ) Notice: Subject to any disclaimer, the term of this patent is extended or adjusted under 35 U.S.C. 154(b) by 766 days.

(21) Appl. No.: 10/734,734

(22) Filed: Dec. 12, 2003

(65) Prior Publication Data

US 2005/0129096 A1    Jun. 16, 2005

(51) Int. Cl.
*H04B 1/69* (2006.01)
(52) U.S. Cl. ..................................... 375/150
(58) Field of Classification Search ................ 375/150, 375/148, 130, 316, 144, 343, 152
See application file for complete search history.

(56) References Cited

U.S. PATENT DOCUMENTS

| 5,331,329 | A | 7/1994 | Volkov et al. | |
| 6,625,201 | B1* | 9/2003 | Stirling-Gallacher | ....... 375/144 |
| 2004/0028121 | A1* | 2/2004 | Fitton | ......................... 375/144 |
| 2004/0131109 | A1* | 7/2004 | Kim et al. | .................. 375/148 |
| 2005/0084039 | A1* | 4/2005 | Kocic et al. | ................ 375/319 |

FOREIGN PATENT DOCUMENTS

WO    WO 98/36505    8/1998

OTHER PUBLICATIONS

Web pages, http://www.gmat.unsw.edu.au/snap/gps//gps_survey/chap3/311.htm, "*GPS Satellite Signal Structure*," Section 3.1.1 GPS Satellite Signals, 6 pages.

Web pages, http://www.gmat.unsw.edu.au/snap/gps//gps_survey/chap3/312.htm, "*The Transmitted Signal*," Section 3.1.2 GPS Satellite Signals, 5 pages.

"Nearly Orthogonal Codes in GNSS Using Unequal Code Lengths;" Qin Zhengdi et al; Proceedings of the ION 60th Annual Meeting, Jun. 7-9, 2004; pp. 666-670; Dayton, OH; whole document.

Web pages, http://www.gmat.unsw.edu.au/snap/gps//gps_survey/chap3/311.htm, "*GPS Satellite Signal Structure*," Section 3.1.1 GPS Satellite Signals, 6 pages, 2004.

Web pages, http://www.gmat.unsw.edu.au/snap/gps//gps_survey/chap3/312.htm, "*The Transmitted Signal*," Section 3.1.2 GPS Satellite Signals, 5 pages, 2004.

* cited by examiner

*Primary Examiner*—Khai Tran
(74) *Attorney, Agent, or Firm*—Alfred A. Fressola; Ware, Fressola, Van Der Sluys & Adolphson LLP

(57) ABSTRACT

A method for determining a delay of a spread data symbol stream comprises the steps of at least partially correlating a signal, which comprises at least first and second spread data symbol streams (300, 301) that are obtained by spreading at least a first and second data symbol stream with a respective first (302) and second code, with said first code (302) to obtain at least two portions (303-1, 303-2) of a Cross-Correlation Function CCF (303), and combining said at least two portions (303-1, 303-2) of said CCF (303) to obtain a combined CCF portion from which a first delay of said first spread data symbol stream is determined, wherein said first code (302) and said second code are composed of chips and wherein the number of chips of said first code (302) is different from the number of chips of said second code. The invention further relates to a computer program, a computer program product, a device and a system.

16 Claims, 8 Drawing Sheets

MULTIPLE ACCESS USING DIFFERENT CODES LENGTHS FOR GLOBAL NAVIGATION SATELLITE SYSTEMS

FIELD OF THE INVENTION

The invention relates to a method for determining a delay of a spread data symbol stream, comprising the steps of at least partially correlating a signal, which comprises at least first and second spread data symbol streams that are obtained by spreading at least a first and second data symbol stream with a respective first and second code, with said first code to obtain at least two portions of a Cross-Correlation Function (CCF) between said signal and said first code, and combining said at least two portions of said CCF to obtain a combined CCF portion from which a first delay of said first spread data symbol stream is determined.

BACKGROUND OF THE INVENTION

In Global Navigation Satellite Systems (GNSS) such as for instance the Global Positioning System (GPS) or the upcoming European Galileo system, a receiver uses triangulation based on the distance to at least three satellites and plausibility considerations to determine its position. For the triangulation, at first the position of the satellites has to be known to the receiver. This information is stored in each receiver. Furthermore, the distance to a satellite has to be determined from the propagation delay of a signal that is emitted by said satellite and subsequently received at said receiver. In the Global Positioning System (GPS), this is achieved by correlation of a spread data symbol stream that has been transmitted by a satellite and received by a receiver with a replica of the code with which the spread data symbol stream has been spread. In the GPS, said data symbol stream corresponds to a navigation message, which has a bit rate of 50 bps, and the code is a Coarse/Acquisition (C/A) code, which is a Gold code appearing like a pseudo-random-noise (PRN) code with a chip rate of 1.023 MHz and a length of 1023 chips, wherein a chip is an element of the set $\{0,1\}$ similar to a bit, but is not representing actual data. The duration of a chip is denoted as $T_c$.

Basically, the spreading operation is performed by modulo-2 addition of the high-chip-rate C/A code and the low bit rate navigation message, so that each bit of the navigation message is modulo-2 added with 20 repetitions of the C/A code of length 1023 chips or duration T=1 ms each.

The GPS navigation message, or, more general, a data stream composed of several data symbols, thus is spread with a code, obtaining a spread data symbol stream, wherein the term spreading refers to the spreading of the frequency bandwidth of the data symbol stream that is increased by a factor that equals the ratio of code chip rate and data symbol rate, which, in the above-mentioned GPS example, equals 20460.

In FIG. 1, said spread data symbol stream 100 is depicted as being composed of two portions 100-1 and 100-2, each corresponding to the duration T of the code. The spread data symbol stream 100 is depicted in discrete-time form, wherein Binary Phase Shift Keying (BPSK) is exemplarily assumed as the modulation technique, so that the symbol alphabet of the spread data symbols is $\{-1,1\}$. The spread data symbol stream is transmitted by a satellite and received as received spread data symbol stream 101 at a receiver. The step of modulating and demodulating the spread data streams is omitted here for ease of presentation. The received spread data symbol stream 101, also in discrete-time form, basically equals the transmitted spread data symbol stream, apart from a propagation delay $\tau_1$. For the scenario of FIG. 1, it was assumed that the Signal-to-Noise Ratio (SNR) at the receiver is large enough and that channel distortions of the propagation channel such as attenuation, phase shift, Doppler shift and multi-path propagation have been compensated, for instance by means of amplification and equalization, so that the chips in both portions 101-1 and 101-2 of the received spread data symbol stream equal the respective chips in the respective portions 100-1 and 100-2 of the transmitted spread data symbol stream 100, apart from the propagation delay $\tau_1$.

At the receiver, the time instance at which the transmitter is starting the transmission of said transmitted spread data symbol stream 100 is known, and at the same time instance, the receiver generates a replica 102 of the code that is used to spread the data symbol stream in the transmitter. This requires the clocks in both the transmitter and receiver to be synchronized. Synchronization of the receiver clock is accomplished by processing the receive signals of at least four satellites, wherein the satellites use high-precision atomic clocks to fix a so-called universal time.

The receiver then computes the Cross-Correlation Function (CCF) 103 between the received spread data symbol stream 101 and the locally generated code replica 102. The CCF for two discrete-time functions $f(n \cdot T_c)$ and $g(n \cdot T_c)$ is defined as $$\varphi_{fg}(m \cdot T_c) = \frac{1}{L} \cdot \sum_{n=0}^{L-1} f(n \cdot T_c) \cdot g((n+m) \cdot T_c),$$

wherein L denotes the length of the summation interval.

For the scenario of FIG. 1, the Auto-Correlation Function (ACF) $\phi_{cc}(m \cdot T_c)$ of the discrete-time code $c(n \cdot T_c)$ 102 is defined as:

$\phi_{cc}(m \cdot T_c) = 1$ if $m=0$;

$|\phi_{cc}(m \cdot T_c)| \leq \Delta$ with $0 \leq \Delta << 1$ if $m \neq 0$ i.e., it has an auto-correlation peak at m=0 and small values elsewhere.

With the received spread data symbol stream 101 in FIG. 1 consisting of two portions 101-1 and 101-2 that are shifted versions of the respective portions 100-1 and 100-2 of the transmitted spread data symbol stream, which in turn represent the spreading of a data symbol with the code of length T, respectively, wherein the respective data symbols of both portions 100-1 and 100-2 are assumed to be equal, the CCF 103 simply contains two times the ACFs $\phi_{cc}(m \cdot T_c)$ of the code $c(n \cdot T_c)$, weighted with the respective data symbol, wherein said first weighted ACF 103a-1 $\phi_{cc}(m \cdot T_c)$ of the code is shifted by the delay $\tau_1$ of the received spread data symbol stream 101 and the second weighted ACF 103a-2 is shifted by $\tau_1 + T$. If further portions 100-3, 100-4 etc. followed the two depicted portions of the transmitted spread data symbol stream 100 (and corresponding portions 101-3, 101-4, etc. in the received spread data symbol stream), the CCF would show further weighted ACFs, each separated from the preceding ACF by a duration of T. The CCF thus is periodic in T.

Apparently, from the CCF, the propagation delay $\tau_1$, which is indicative of the distance between the transmitter and the receiver, can be determined from the position of the auto-correlation peak 103a-1.

The scenario as described in FIG. 1 assumed that the SNR at the receiver was high enough so that the received spread data symbol stream 101 equals a shifted version of the transmitted spread data symbol stream 100. However, at operating points where GNSS receivers are normally deployed, the SNR may be smaller, so that the received spread data symbol stream 101 does no longer equal the delayed transmitted spread data symbol stream 100, for instance some of the chips within the received spread data symbol stream 101 may be changed by an additive noise process in a way that they more resemble a different BPSK symbol. Furthermore, the received spread data symbol stream may become complex-valued due to the fact that both the amplitude and phase of its chips are altered by noise and channel distortion. Due to the random characteristics of the propagation channel and the noise process that adds to the received signal at the receiver, the errors in the spread data symbol stream 101 are different in different portions 101-1 and 101-2 of the received spread data symbol streams. The CCF 103 then no longer consists of the periodically repeated weighted ACF of the code, but may contain further small peaks at time instances different from the actual auto-correlation peaks at $\tau_1 + i \cdot T$, where is an integer with i=0, 1, . . . . Furthermore, the amplitude of said auto-correlation peaks may be smaller.

To combat this effect, which aggravates the proper detection of the propagation delay $\tau_1$, combining at least two corresponding portions 103-1 and 103-2 of the CCF 103 can be performed. It is the aim of the combining procedure to reduce the effect of the random distortions in the ACFs of the codes within the CCF 103 and to obtain a combined CCF that allows for a more precise and robust determination of the propagation delay $\tau_1$. For instance, the portion 103-1 of the CCF 103 from time instance $\tau=0$ to time instance $\tau=T$ and the portion 103-2 of the CCF 103 from time instance $\tau=T$ to time instance $\tau=2T$ may be combined by integration or averaging. When integration (or summing) is used, the values of corresponding time instances of the different CCF portions 103-1, 103-2 are integrated to obtain an integrated value for each of said time instances, which then represent an integrated CCF portion. Due to the periodic character of the ACF peaks 103a-1 and 103a-2, i.e. the fact that the ACF peaks are always located at the same time instance within a portion 103-1, 103-2 of the CCF 103, the ACF peaks then are steadily enhanced during the integration, whereas the distortions, due to their random occurrence at different time instances, are not enhanced to the same degree as the ACFs. Consequently, the combined CCF portion has an increased sensitivity than the single CCF portions 103-1, 103-2 and the desired propagation delay $\tau_1$ is more securely detected from the position of the enhanced ACF peak in the combined CCF portion.

As already mentioned, the distances to at least three satellites are required in a GNSS system to accomplish triangulation. To this end, the transmitted spread data symbol streams of at least three satellites are received, as depicted in FIG. 2.

FIG. 2 depicts the reception of first, second and third received spread data symbol streams 200, 201 and 202, which are delayed with respective propagation delays $\tau_1, \tau_2$ and $\tau_3$. Each received spread data symbol stream 200, 201 and 202 has been generated from respective first, second and third data symbol streams by spreading with a respective first, second and third code, transmitted by a respective satellite and delayed by a respective propagation delay $\tau_1, \tau_2$ and $\tau_3$ due to the different distances between the transmitting satellites and the receiver. In contrast to the illustration in FIG. 2, the receiver does not separately receive said spread data symbol streams 200, 201 and 202, but only receives a signal that is a superposition of said three spread data symbol streams 200, 201 and 202.

The receiver then correlates the received signal with replicas of codes that are used by each transmitting satellite, respectively. In FIG. 2, exemplarily the generation of a replica 203 of the first code that is used by the satellite that transmitted the first spread data symbol stream and the correlation of this first code replica with the received signal is depicted. The resulting cross-correlation function 204 now does not only contain the periodically repeated weighted ACFs 204a-1 and 204a-2 of the first code, but also periodically repeated CCFs 204b-1 and 204b-2 between the first and second code and periodically repeated CCFs 204c-1 and 204c-2 between the first and third code, each weighted with the respective data symbols of the second data symbol stream and the third data symbol stream. The CCF 204 between the receive signal that comprises the first, second and third received spread data symbol streams and the replica 203 of the first code thus still is periodic in T, wherein T is the length of the first, second and third code, but the detection of the desired delay $\tau_1$ is aggravated in particular if the amplitudes of the CCFs 204b and 204c within the CCF 204 approach the amplitudes of the ACFs 204a. Note that, whereas random distortions in the received spread data symbol streams that stem from noise may be reduced by averaging over several portions 204-1, 204-2 of the CCF 204 as explained above, the influence of the CCFs 204b and 204c are of systematic character and can not be averaged out of the CCF 204.

When designing the GNSS, it is thus advantageous to select codes for the different satellites that have high auto-correlation peaks and low cross-correlation peaks, so that the delays $\tau$ can be securely detected.

The above-mentioned properties of the codes can be approached by increasing the length of the codes. However, increasing the length of the codes generally slows down the acquisition time and vastly increases the computational complexity of the receiver and thus its costs.

A different approach to reduce the cross-correlation uses scrambling codes that comprise significantly more chips than the spreading codes in addition to the scrambling codes. However, as it is the case with increased lengths of the spreading codes, the computational complexity of the receiver increases when scrambling is used.

SUMMARY OF THE INVENTION

In view of this problem, it is thus an object of the present invention to improve the determination of a delay of a spread data symbol stream.

It is proposed that a method for determining a delay of a spread data symbol stream comprises the steps of at least partially correlating a signal, which comprises at least first and second spread data symbol streams that are obtained by spreading at least a first and second data symbol stream with a respective first and second code, with said first code to obtain at least two portions of a Cross-Correlation Function (CCF) between said signal and said first code, and combining said at least two portions of said CCF to obtain a combined CCF portion from which a first delay of said first spread data symbol stream is determined, wherein said first code and said second code are composed of chips and wherein the number of chips of said first code is different from the number of chips of said second code.

Said method may for instance be used in a GNSS system to determine the distance between satellite transmitters and a receiver based on determined propagation delays, or in a communication system with Code Division Multiple Access (CDMA) as medium access technique to achieve coarse synchronization. Said at least first and second data symbol streams may for instance be bit streams with a respective first and second bit rate, which may be spread with respective first and second codes that are composed of respective numbers of chips (belonging to a chip alphabet $\{0,1\}$) and may be characterized by a respective first and second chip rate. Spreading may be performed by chip-by-chip modulo-2 addition of the chips of said respective first and second code to the bits of the respective first and second data symbol streams, yielding respective first and second spread data symbol streams that may also be characterized by a first and second chip rate. Said first and second spread data symbol streams then may be mapped to modulation symbols such as for instance Binary Phase Shift Keying (BPSK) symbols belonging to the alphabet $\{-1,1\}$. Alternatively, said spread data symbol streams may be further processed without modulation.

Said at least first and second data symbol streams may equally well be modulation symbols that correspond to the bits of a bit stream, for instance Binary Phase Shift Keying (BPSK) symbols or Quaternary Phase Shift Keying (QPSK) symbols, and said at least first and second data symbol streams may then be spread with said first and second codes (with chips belonging to the alphabet $\{-1,1\}$) by chip-by-chip multiplication of the chips of the respective codes with the data symbols of said respective first and second data symbol streams, yielding respective first and second spread data symbol streams. Said first and second data symbol streams may then be pulse-shaped, modulated with a carrier frequency and transmitted by a transmitter. At a receiver, a signal may be received that is a superposition of delayed versions of said transmitted spread data symbol streams, wherein said respective delays stem from the traveling distance between the respective transmitter and the receiver and may be counted from a respective time instance, at which a transmission of a respective spread data symbol stream has started. Said respective time instances at which said respective transmissions are started may all coincide due to the use of a universal time for all transmitters. In addition to the respective delays, said transmitted spread data symbol streams contained in said signal may be attenuated and corrupted by noise. Transmission may take place via a wired or a wireless connection. At the receiver, said signal may be amplified, demodulated (only if they were modulated at the transmitter) and sampled. Furthermore, equalization may be performed to combat the distortions of the propagation channel between transmitter and receiver. Said signal is correlated with said first code, a replica of which may be generated by said receiver, wherein said correlation may be performed in discrete or continuous time, yielding either a discrete-time CCF or a continuous-time CCF. Said replica of said first code may be synchronized with the time instance at which the transmission of said first spread data symbol stream was started. Said correlation may be performed for the entire signal, or partially, i.e. only for selected portions of the signal. Correspondingly, then either the complete CCF between the signal and the code is obtained, or only portions of said CCF are obtained. At least two portions of said CCF are then combined. If the complete CCF is calculated, portions of said CCF may have to be selected prior to combination. If said CCF has only been calculated partially, either the calculated portions or a selection of portions of said calculated portions may be combined. Said combination enhances the sensitivity of the combined CCF portion in comparison to the sensitivity of the CCF, so that a first delay can be detected from said combined CCF portion in a more robust and accurate way than it is possible from the CCF. Combination may comprise averaging or integration, times series analysis or statistical processing of the portions of the CCF.

The number of chips of said first code is advantageously chosen different from the number of chips of said second code, so that dominant cross-correlation peaks (that stem from the cross-correlation between said first and second code) in said at least two portions of said CCF that are combined do not appear at corresponding positions within said at least two portions of said CCF and are thus not enhanced when said at least two portions of said CCF are combined. In contrast, auto-correlation peaks (that stem from the auto-correlation of said first code) appear at corresponding positions within said at least two portions of said CCF and are thus enhanced by the combining. From the position of the enhanced auto-correlation peaks within the combined CCF portion, the first delay can be determined. The use of different numbers of chips within said first and second code leads to different spreading gains at the receiver, when the received spread data symbols are de-spread. The relative difference in spreading gain between codes is insignificant for large numbers of chips in each code and only small differences between the numbers of chips in each code. Due to the different numbers of chips in the spreading codes, the method of the present invention may be specified as a Vary Length Code Division Multiple Access (VL-CDMA) method in contrast to the state-of-the-art CDMA methods that apply equal spreading code lengths for all codes.

According to the method of the present invention, it may be preferred that said step of combining said at least two portions of said CCF comprises the step of averaging said at least two portions of said CCF or integrating said at least two portions of said CCF. When averaging said at least two portions of said CCF, the average is taken over the values at corresponding positions in said at least two portions of said CCF, for instance, the first value in each portion is averaged to yield a first average value which represents the first value of the combined CCF portion, then the second value in each portion is averaged to yield a second averaged value, and so forth. Similar, when integration is performed, the respective first values in each portion may be summed to obtain a first value of the combined CCF portion, and so forth. Before averaging or integrating the portions, the absolute value of the values in each portion may be taken. Both averaging and integrating may be performed coherently or non-coherently and both in discrete or continuous time.

According to the method of the present invention, it may be preferred that the number of chips of said first code and the number of chips of said second code are not multiples of each other.

According to the method of the present invention, it may be preferred that the chip rates of said at least first and second spread data symbol streams are equal. The data symbol rates of said at least first and second data symbol streams may be different, and due to the use of first and second code with respective different numbers of chips, but with the same chip rate each, the respective chip rates of the respective first and second spread data symbol stream may be made equal. As the chip rate of the code, which is defined as the reciprocal value of the chip duration, the chip rate of the spread data symbol stream is also defined as the reciprocal value of the chip duration. The spreading operation does not change the duration of a chip.

According to the method of the present invention, it may be preferred that N chips of said at least first and second spread data symbol stream are contained in a frame, respectively, and wherein N is the least common multiple of the number of chips of said first code and the number of chips of said second code. Selecting the lengths of the codes in a way that said at least first and second spread data symbol streams can be organized in frames that comprise the same number of chips allows for frame synchronization between said at least first and second spread data symbol streams.

According to the method of the present invention, it may be preferred that said first code and second code are software codes and/or pseudo-random-noise codes. Said codes may for instance be systematically generated, such as for instance Gold codes, or randomly generated. In both cases, the codes may appear like random noise, they may for instance be zero-mean.

According to the method of the present invention, it may be preferred that said first code and second code are taken from the same basic code and only differ in the number of chips. Said first and second codes are then obtained from said basic code by simple copying, for instance the first code copies the first 1023 chips, and the second code copies the first 1022 chips from said basic code. The method then can be considered as an independent medium access technique (Vary Length Multiple Access, VLMA), because concurrent access to a shared transmission medium is not achieved by assigning pseudo-orthogonal codes to each transmitter, but by assigning each transmitter the same code and only varying the length of each transmitters code to some extent. It is advantageous in VLMA to combine at least two portions of said CCF in order to enhance the auto-correlation peaks and to reduce the impact of cross-correlation peaks that quite naturally arise because all assigned codes are basically equal.

According to the method of the present invention, it may be preferred that said signal further comprises a third spread data symbol stream that is obtained by spreading a third data symbol stream with a third code, wherein said third code is composed of chips and wherein the number of chips of said third code is equal to the number of chips of said first code or to the number of chips of said second code. It is thus not required that each data symbol stream is spread with a code that has a different length compared to the length of the codes with which the other data symbol streams are spread. Two codes may thus have the same length, a principle that may be denoted as "code length reuse". It may be preferred that the codes that have the same length are not separated via VLMA, i.e. are not copied from the same basic code.

According to the method of the present invention, it may be preferred that said first and second code are time-invariant. Then for the transmission of all spread data symbol streams, always the same first and second codes are used, i.e. the sequence of chips within each code and the length of each code does not change. This omits the required amount of signaling encountered when codes would be changed.

According to the method of the present invention, it may be preferred that said first and second code are changed in certain intervals. It may be advantageous to change the sequence of chips within each code or the length of each code between subsequent transmissions of spread data symbol streams, i.e. there may exist spread data symbol streams originating from one transmitter that have been spread with different codes. This technique represents a powerful means against jamming.

According to the method of the present invention, it may be preferred that said first and second code are periodically changed so that the average number of chips in said respective first and second code is equal. When the chip rate of all codes is equal, but at least two codes have different numbers of chips, at least the two data symbol streams that are spread with the at least two codes that have different numbers of chips have to have different data symbol rates. If on the average, constant data symbol rates are desired for all data symbol streams, the codes themselves or only the length of the codes may be periodically changed at least for the two data streams that have different data symbol rates. E.g. for the transmission of a first data symbol stream, a first code of 1023 chips is used for a limited time, and then a code of 1022 chips is used for a further limited time. Concurrently, for the transmission of a second data symbol stream, a second code of 1022 chips is used for said limited time, and then a code of 1023 chips is used for said further limited time. Then the average symbol rates of both data symbol streams is equal, although in both limited time periods, different code lengths have been used. This concept may be denoted as "code length hopping". In effect, then the chip rate and the average data symbol rate of all spread data symbol streams is equal, which is highly desirable.

According to the method of the present invention, it may be preferred that said signal is a receive signal comprising the superposed spread data symbol streams that have been transmitted by satellite transmitters and received at a receiver with respective propagation delays, and wherein said propagation delays are indicative of the distance between said receiver and said respective satellite transmitters. Said satellites may transmit navigation messages of low bit rate that indicate correction information, for instance correction information concerning the ephemeris of the satellite or the propagation model, which are spread with a C/A code of higher chip rate. The spread navigation messages are then transmitted by the satellite, propagate through the channel between the satellite and a receiver and are accordingly delayed. Said delay is basically proportional to the distance between the satellite and the receiver, apart from non-linear influences of the propagation channel. From the estimation of distances to at least three satellites, the receiver is enabled to determine its position via triangulation, the distance towards a fourth satellite may be required to synchronize the local clock of the receiver to the universal time of the satellites.

According to the method of the present invention, it may be preferred that said satellite transmitters are satellite transmitters of a Global Navigation Satellite System (GNSS). Said system may for instance be the Global Positioning System (GPS) or the European Galileo system.

It is proposed that a computer program comprises instructions operable to cause a processor to perform the above mentioned method steps. Said computer program may be loaded into the internal memory of a processor that is integrated in a receiver.

It is proposed that a computer program product comprises a computer program with instructions operable to cause a processor to perform the above-mentioned method steps.

It is proposed that a device for determining a delay of a spread data symbol stream comprises means for at least partially correlating a signal, which comprises at least first and second spread data symbol streams that are obtained by spreading at least a first and second data symbol stream with a respective first and second code, with said first code to obtain at least two portions of a Cross-Correlation Function (CCF) between said signal and said first code, and means for combining said at least two portions of said CCF to obtain a combined CCF portion, from which a first delay of said first spread data symbol stream is determined, wherein said first code and said second code are composed of chips and wherein the number of chips of said first code is different from the number of chips of said second code. Said device may be part of a GNSS receiver or may be part of a control station that performs the determination of the delay and offers said delay information to GNSS receivers or the satellites themselves.

It is proposed that a system comprises at least a first and a second transmitter, which transmit respective first and second spread data symbol streams that are obtained by spreading at least a respective first and second data symbol stream with a respective first and second code, wherein said first code and said second code are composed of chips and wherein the number of chips of said first code is different from the number of chips of said second code, and at least one receiver, wherein said receiver receives a signal comprising at least said respective first and second spread data symbol streams, wherein said receiver at least partially correlates said signal with said first code to obtain at least two portions of a Cross-Correlation Function (CCF) between said signal and said first code, and wherein said receiver combines said at least two portions of said CCF to obtain a combined CCF portion, from which a delay of said first spread data symbol stream is determined.

BRIEF DESCRIPTION OF THE FIGURES

These and other aspects of the invention will be apparent from and elucidated with reference to the embodiments described hereinafter. In the figures show.

DETAILED DESCRIPTION OF THE INVENTION

Figure 3:
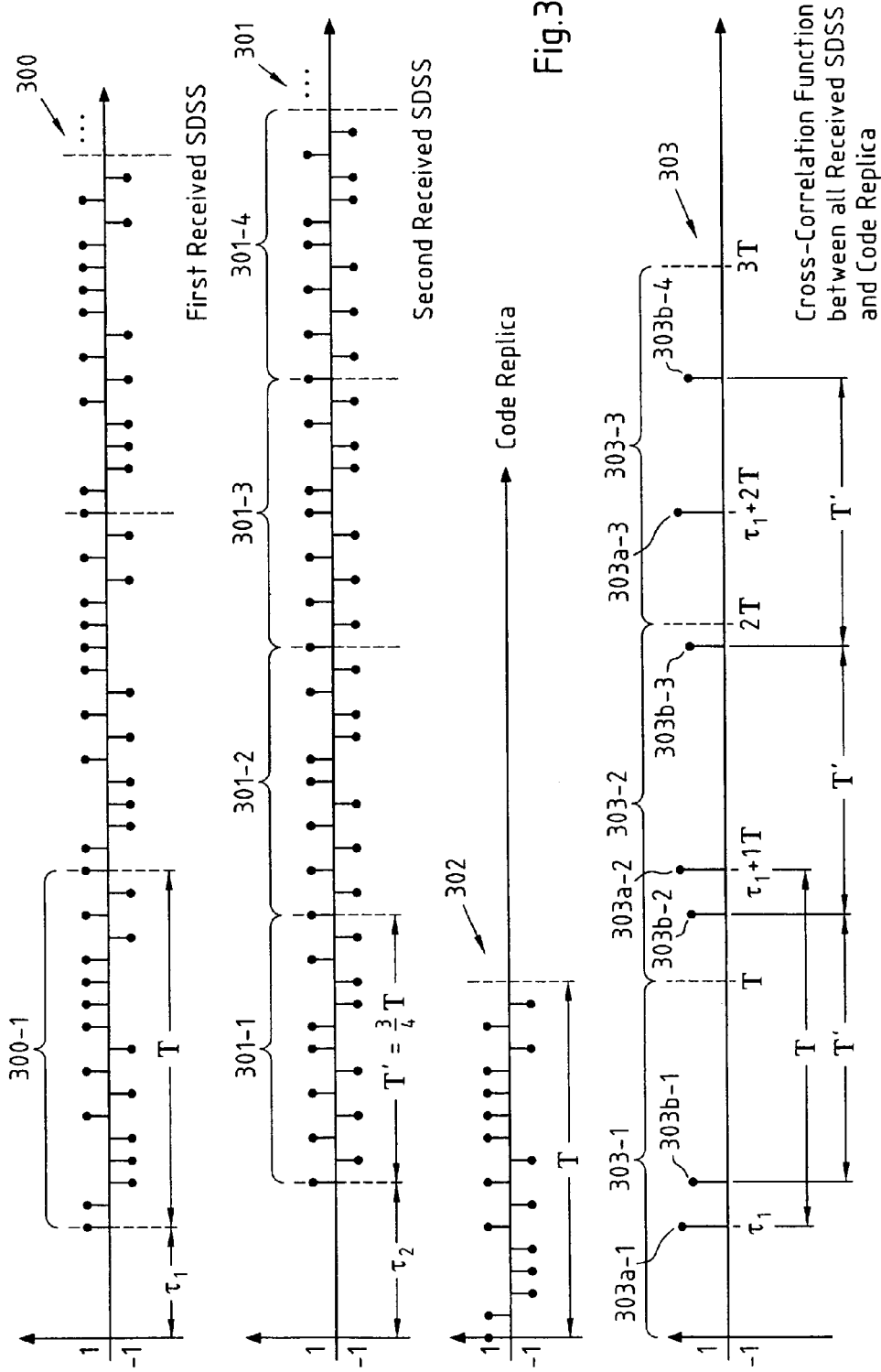
FIG. 3: a schematic illustration of the synthesis of a Cross-Correlation Function (CCF) in a multi-transmitter GNSS system according to the present invention.

FIG. 3 schematically illustrates the synthesis of a Cross-Correlation Function (CCF) in a multi-transmitter GNSS system according to the present invention. The first row of FIG. 3 shows a first received Spread Data Symbol Stream (SDSS) 300 that basically represents a delayed version of a first transmitted SDSS. Said first transmitted SDSS 300 is obtained by spreading a data symbol stream with a first code 302. In the first row of FIG. 3, only three repetitions of the code 302 of duration T each are depicted, wherein it is assumed that each repetition of the code spreads one data symbol. BPSK modulation is assumed, so that the symbol alphabet of the SDSS is $\{-1,1\}$. However, modulation is not mandatory. The SDSS then may be subject to pulse shaping and modulation on a carrier frequency, such as for instance the L1 carrier of a GPS system, and then is transmitted to a receiver over a channel that causes a first propagation delay $\tau_1$. Similarly, a second SDSS is transmitted by a second transmitter and delayed by a second delay $\tau_2$, as shown in the second row of FIG. 3.

Figure 2:
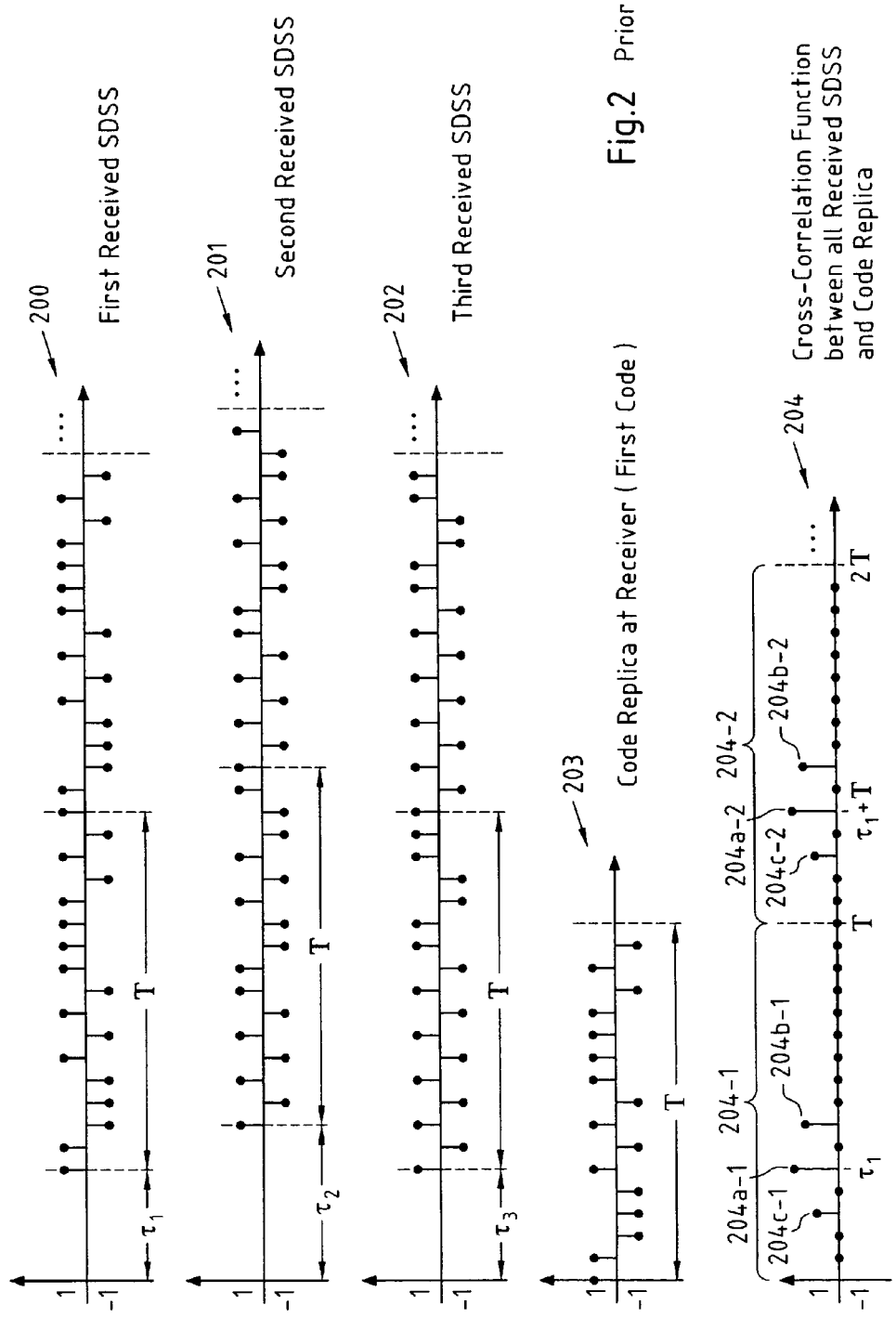
FIG. 2: a schematic illustration of the synthesis of a Cross-Correlation Function (CCF) in a multi-transmitter GNSS system according to the prior art.

However, in contrast to the scenario of FIG. 2, the number of chips of the first code that is used to spread the first data symbol stream is different from the number of chips of the second code that is used to spread the second data symbol stream, as can be seen from the comparison of the first and second row of FIG. 3. The first code has a length of T and comprises 16 chips, wherein the second code has a length of T'=¾T and comprises only 12 chips. The chip rate of both codes equals the reciprocal value of the chip duration $T_c$ and is equal for both the first and second code. However, to allow for frame synchronization between the frames of the first and second transmitter, the number of chips of the first and second code were chosen so that the number of chips per frame is the least common multiple of the number of chips of the first and second code. In the present example, a frame comprises 64 chips, corresponding to three repetitions of the first code of length 16 chips and four repetitions of the second code of length 12 chips. Correspondingly, three data symbols of the first data symbol stream are contained in said frame, whereas four data symbols of the second data symbol stream are contained said frame. The data symbol rate of said first data symbol stream is thus by a factor ¾ smaller than the data symbol rate of the second data symbol stream.

Figure 1:
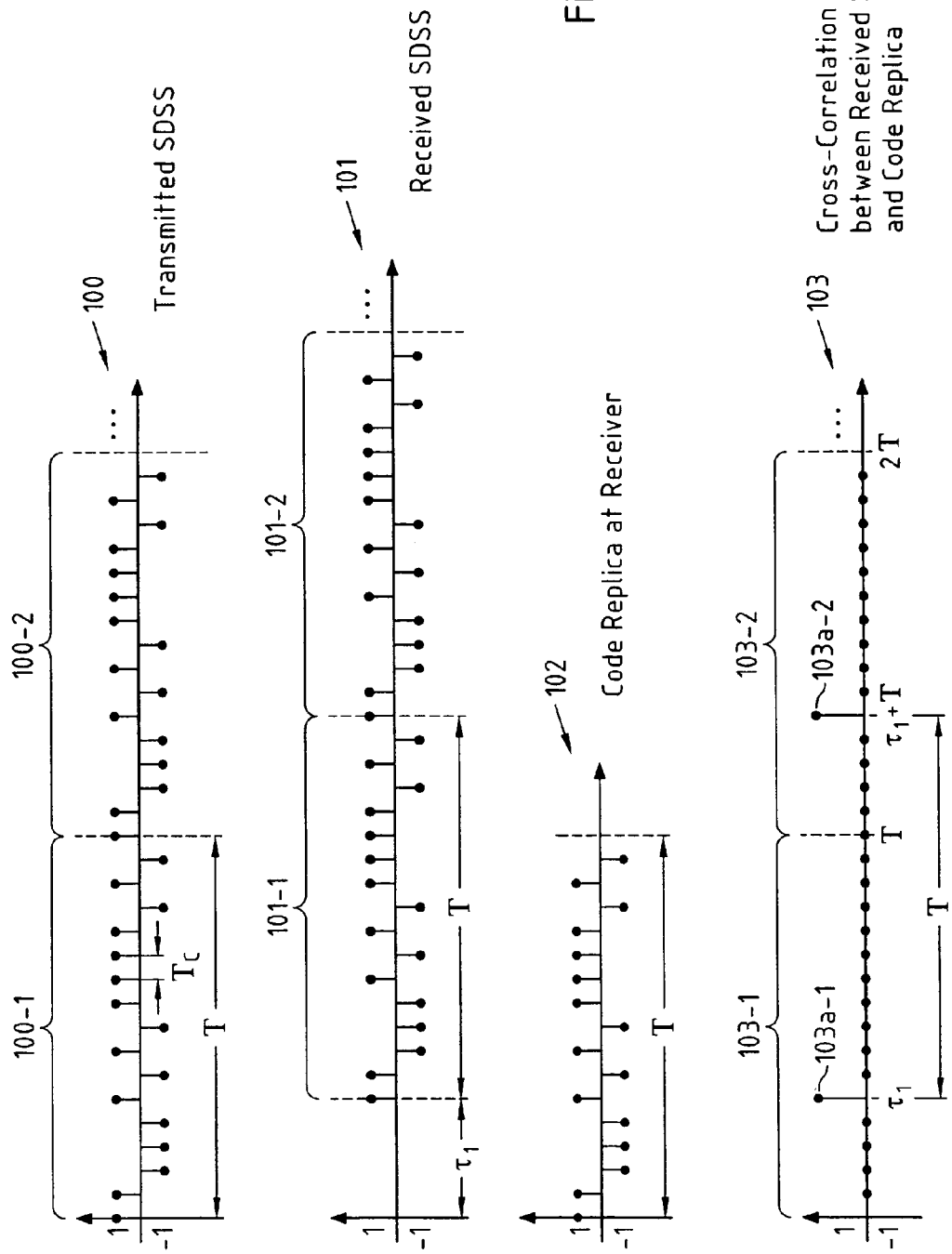
FIG. 1: a schematic illustration of the synthesis of a Cross-Correlation Function (CCF) in a single-transmitter GNSS system according to the prior art.

At the receiver, said two received SDSS 300, 301 as depicted in the first and second row of FIG. 3 contribute to one receive signal that may be demodulated (if they were modulated before), filtered with a pulse-shape matched filter and sampled at the receiver. Furthermore, signal amplification and equalization may be performed to combat the attenuation and distortion of the channel. Said receive signal is correlated with a replica of said first code 302 as shown in the third row of FIG. 3. The code replica 302 is generated by the receiver at a time instance at which the first transmitter is known to transmit the first SDSS. Said correlation produces the CCF 303 as depicted in the lowermost row of FIG. 3. As in FIGS. 1 and 2, this CCF is to be understood in an illustrative way and does not represent the actually calculated CCF. The auto-correlation peaks 303a-1, . . . , 303a-3 of the first code 302, stemming from the correlation of the first code 302 with the first received SDSS 300, are the same as in FIG. 2, i.e. occur $\tau_1 + i \cdot T$, with i=0, . . . , 2. However, the cross-correlation peaks 303b-1, . . . , 303b-4 appear periodically, but now with a period of T'=¾T (this is at least true when disregarding transient effects of the CCF 303). The effect of the change of this period T' of the cross-correlation peaks, as compared to the period T of the cross-correlation peaks in FIG. 2, is that when now portions 303-1, 303-2 of the CCF 303, for instance the portion 303-1 of the CCF 303 starting at time instance $\tau=0$ to time instance $\tau=T$ and the portion 303-2 of the CCF 303 starting at time instance $\tau=T$ to time instance $\tau=2T$ are combined by integration, the relative position of the auto-correlation peak 303a-1 in the first portion and the relative position of the auto-correlation peak 303a-2 in the second portion is the same, i.e. both auto-correlation peaks are to be found at a distance $\tau_1$ from the left border of the respective portion 303-1, 303-2, so that the amplitude of the auto-correlation peak is effectively doubled when integrating said both portions 303-1, 303-2 of the CCF 303. However, the relative position of the cross-correlation peak 303b-1 within the first portion 303-1 and the relative positions of the cross-correlation peaks 303b-2 and 303b-3 within the second portion 303-2 of the CCF 303 are not the same, so that when integrating both portions 303-1, 303-2 of the CCF 303, the cross-correlation peaks are not enhanced. Thus by integration of said two portions of the CCF 303 in combination with the use of different numbers of chips in the first and second code, which causes the auto-correlation peaks and the cross-correlation peaks within the CCF 303 to have different periods, the ratio between the amplitude of the auto-correlation peak to the maximum amplitude that is achieved by any of the correlation peaks is vastly increased, which may be interpreted as an increase in the signal-to-interference ratio. This increased signal-to-interference ratio allows for a more robust and precise determination of the propagation delay $\tau_1$ from the combined CCF portion.

Figure 4:
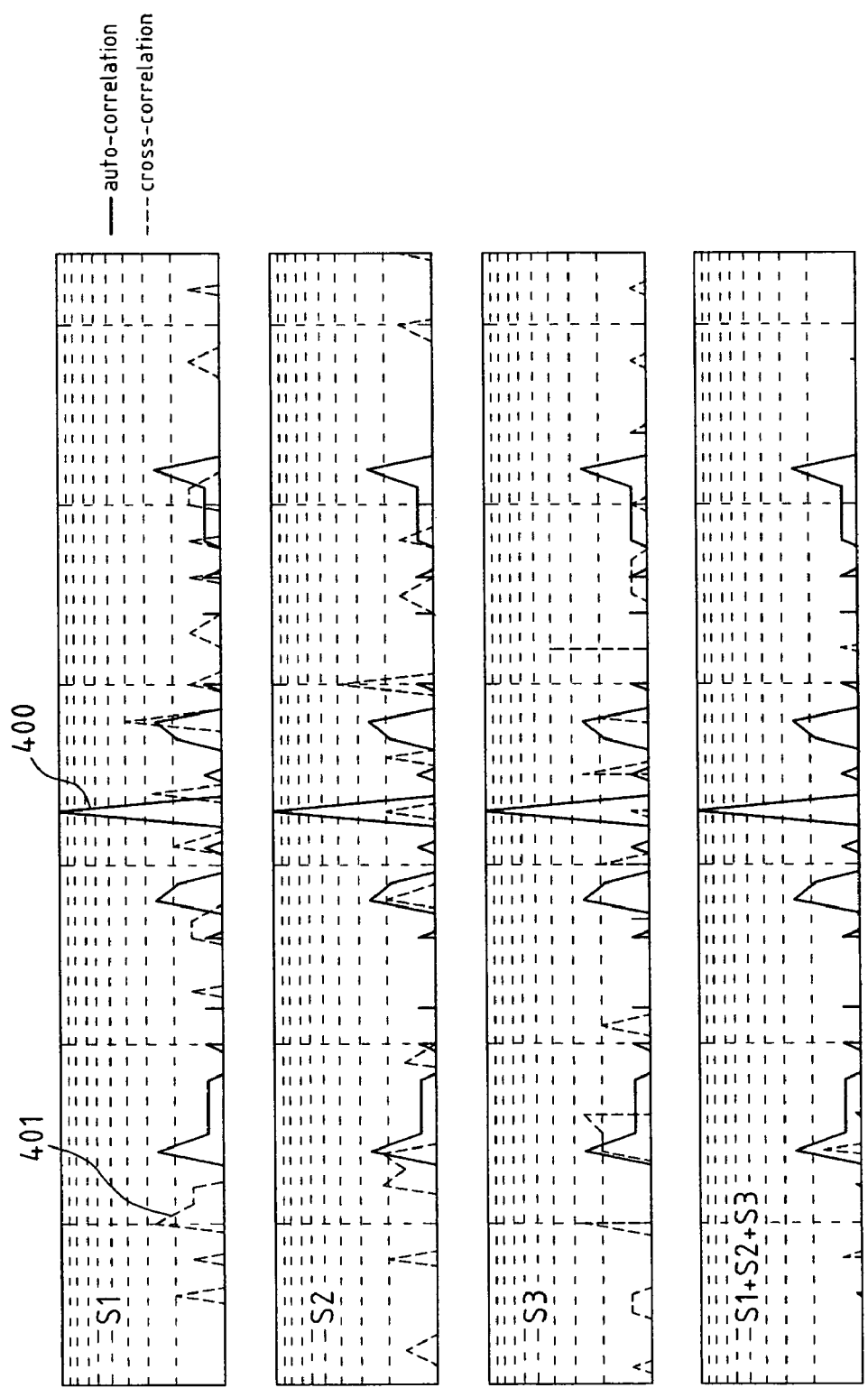
FIG. 4: an illustration of the process of combining portions of a CCF into a combined CCF portion according to the present invention.

FIG. 4 is an illustration of the process of combining different portions S1, S2 and S3 of a CCF into a combined CCF according to the present invention. In the first three rows of FIG. 4, a respective portion S1, S2 and S3 of a CCF similar to the portions of the CCF 303 in the last row of FIG. 3 is depicted, respectively, wherein the CCF in FIG. 4 is computed between a receive signal that comprises the received SDSSs of a first and a second transmitter, and a first code, wherein said first code is used by the first transmitter and comprises $N_1$=64 chips, and wherein the second code is used by the second transmitter and comprises $N_2$=62 chips. The solid line 400 represents the auto-correlation peaks, and the dashed line 401 represents the cross-correlation peaks.

As can be seen from the first three rows of FIG. 4, the auto-correlation peaks 400 remain at their positions within the portions of the CCF, whereas the cross-correlation peaks 401 are moving due to the different number of chips in the first and second code.

The last row of FIG. 4 shows the combined CCF portion that is yield by integrating the CCF portions S1, S2 and S3 in the three rows above, whereas the ordinate scale in the last row of FIG. 4 is different as compared to the three rows above: Apparently, the auto-correlation peaks 400 have been enhanced, whereas the cross-correlation peaks 401 are barely visible in the changed scale.

Figure 5:
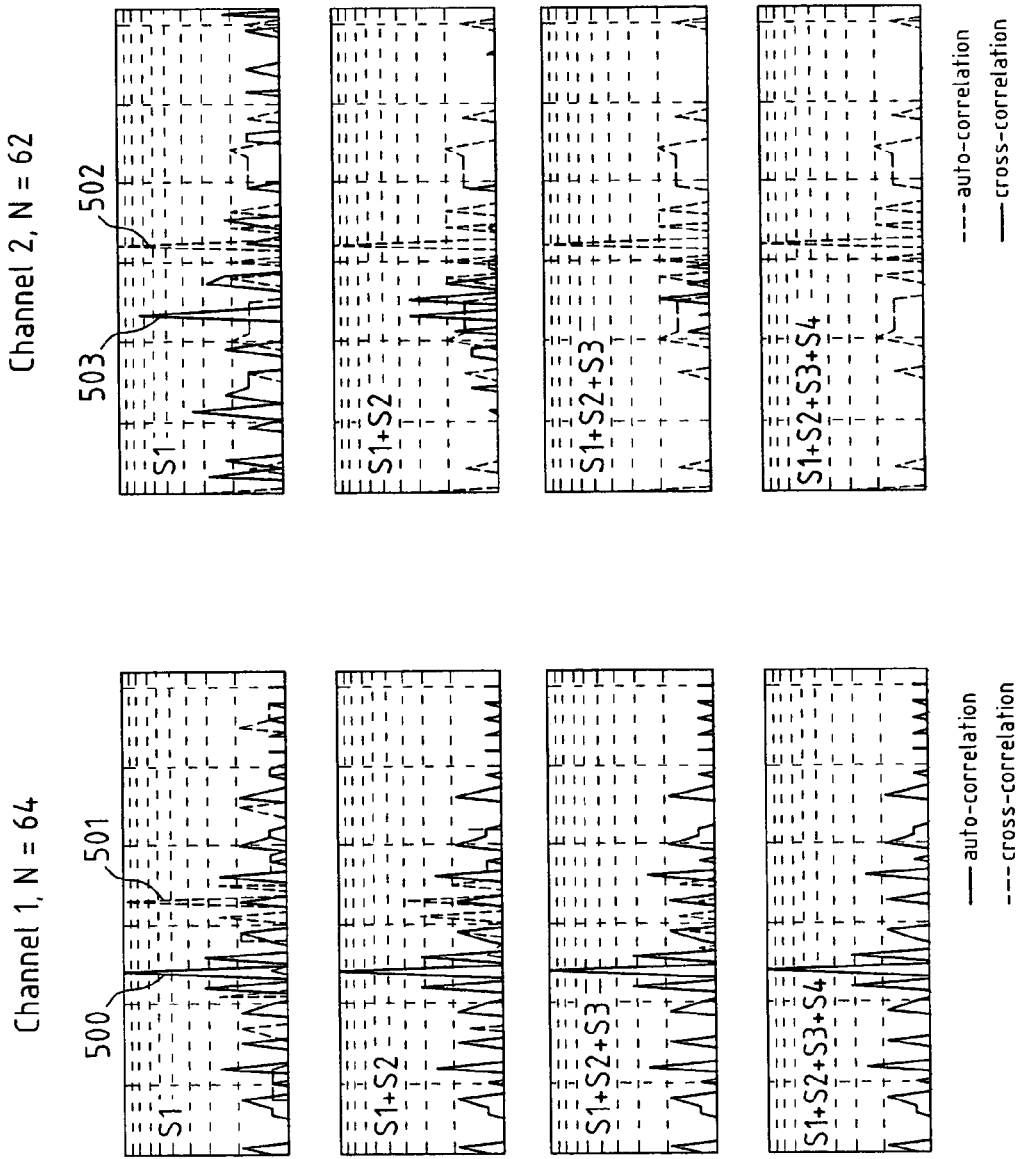
FIG. 5: an illustration of the process of combining portions of a CCF into a combined CCF portion according to the Vary Length Multiple Access (VLMA) technique according to the present invention.

FIG. 5 is an illustration of the process of combining portions S1-S4 of a CCF into a combined CCF according to the Vary Length Multiple Access (VLMA) technique according to the present invention. A first transmitter uses a first code of length $N_1$=64 chips, and a second transmitter uses exactly the same code, but with the last two chips cut off, so that the second code only comprises $N_2$=62 chips. A portion S1 from the CCF between the receive signal and the first code is depicted in the left column of FIG. 5, whereas a portion S1 from a CCF between the same receive signal and the second code is depicted in the right column of FIG. 5. In the left column plots, the auto-correlation peaks 500 are given in solid lines and the cross-correlation peaks 501 are given in dashed lines, whereas in the right column, the auto-correlation peaks 502 are given in dashed lines and the cross-correlation peaks 503 are given in solid lines. The second row of FIG. 5 shows the respective results of integrating over two portions S1 and S2 of the respective CCFs, the third row shows the result of the integration over three portions S1-S3 of the respective CCF, and so forth.

As can be spotted from the first row of FIG. 5, when only considering one portion of the CCF and using merely the same code for both transmitters according to the VLMA principle, the auto-correlation peaks and the cross-correlation peaks reach approximately the same amplitudes. Proper detection of a transmission delay, or, as it is desired in VLMA, separation of the data symbol streams of two transmitters, is not possible. However, as can be seen from the second to the fourth row of FIG. 5, with increasing numbers of portions of the CCFs that are integrated, the amplitudes of the respective cross-correlation peaks decrease as compared to the amplitudes of the auto-correlation peaks. After only two integrations, cf. the second row of FIG. 5, already proper detection of the first and second propagation delays and separation of the signals data symbol streams of the first and second transmitter is possible.

Figure 6:
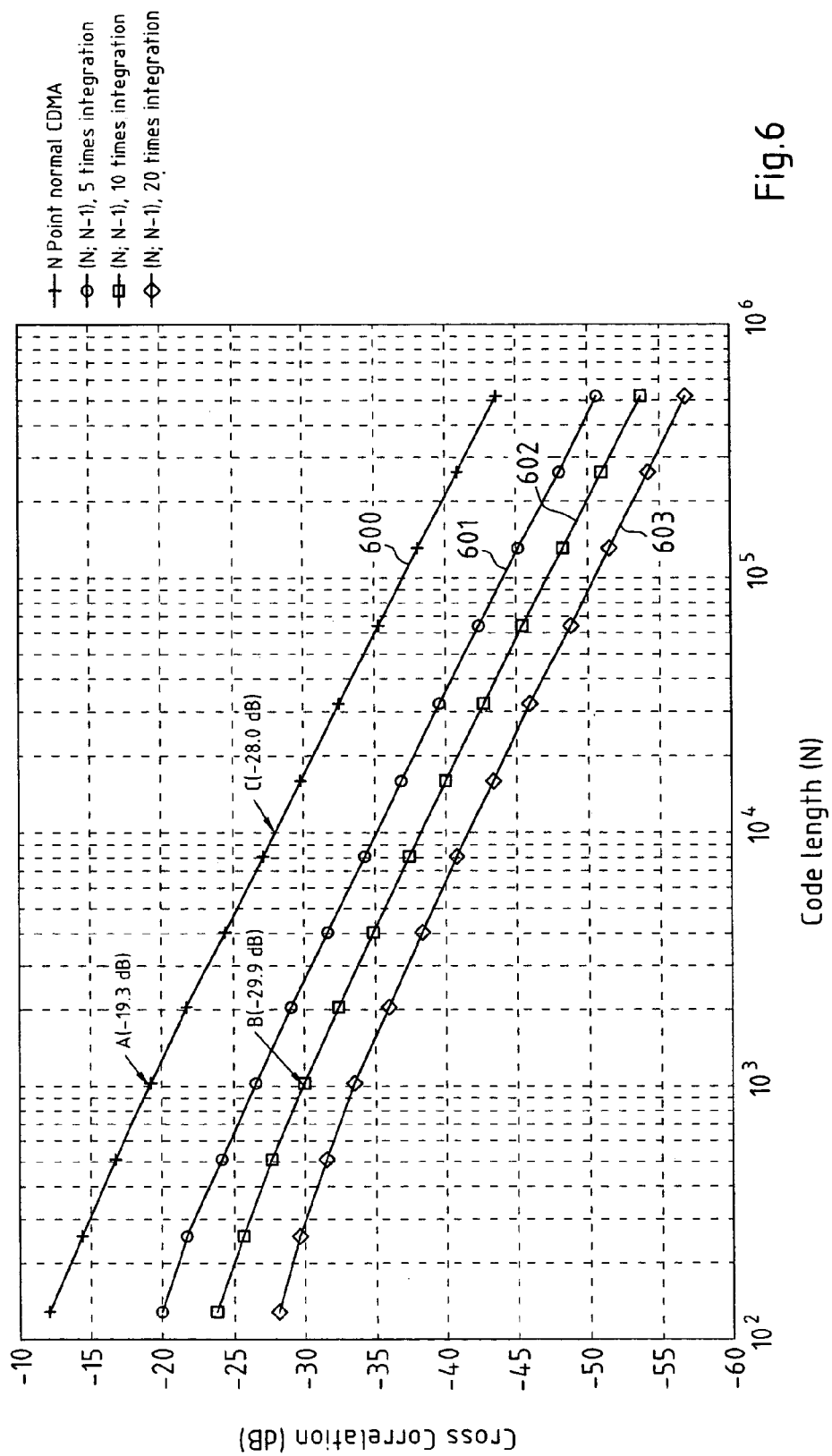
FIG. 6: a comparison of the achievable reduction of the cross-correlation as a function of the code length according to the prior art and according to different parameterizations of the present invention.

FIG. 6 presents a comparison of the achievable reduction of the cross-correlation in dB as function of the code length N according to the prior art and according to different parameterizations of the present invention.

The curve 600 represents a state-of-the-art CDMA system with pseudo-random spreading codes of length N, wherein the codes of both transmitters have the same length. Curve 601 represents a system according to the present invention with a first code of length N and a second code of length N−1, wherein 5 different portions of the CCF are integrated. For curves 602 and 603, 10 and 20 integrations have been performed, respectively.

It can be readily seen that performance improves from curves 600 to 603. In particular, as can be seen when comparing the operating points A (−19.3 dB) and B (−29.9 dB), a gain of $10 \cdot \log_{10}(M)$=10 dB in cross-correlation can be achieved when replacing a state-of-the-art CDMA system by a system according to the present invention and performing M=10 integrations therein. Furthermore, it can be seen that the increase of the length of the codes reduces the cross-correlation encountered in all four considered systems. However, when comparing operating points B (−29.9 dB) and C (−28.0 dB), is becomes evident that when using the system according to the present invention with 10 integrations and a code length of N=1000 chips (for the first code, and 999 chips for the second code), the cross-correlation is still nearly 2 dB lower as in the state-of-the-art system with a code length of 10000 chips. The present invention, by using computationally cheap 10-fold integration, thus performs even better that a system that uses 10 times longer codes, which is of particular relevance when noting that the computational complexity increases exponentially with the code length. The additional computational complexity required to perform the 10-fold integration can be neglected compared to the computational complexity encountered when increasing the length of the codes by a factor 10.

Figure 7:
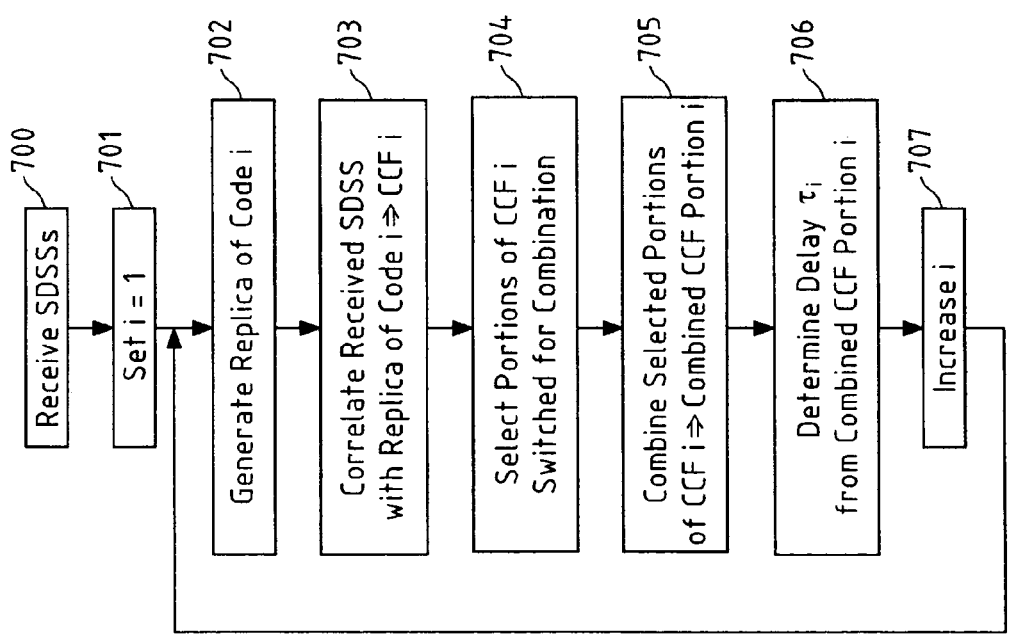
FIG. 7: a flow chart depicting the relevant method steps of the present invention.

FIG. 7 depicts a flow chart of the method according to the present invention. In a first step 700, the delayed SDSS as transmitted by a plurality of transmitters are received as a superposition. Then the code index is set to i=1 (step 701), and a replica of the first code is generated in a step 702, wherein said replica is synchronized with the transmission instance of the transmitted that uses said first code. In step 703, the superposition of the received SDSS is correlated with said first code in order to obtain a complete first CCF or portions thereof. In a step 704, portions of said complete first CCF or of said portions of said CCF are selected for combination, and actually combined in step 705 by means of integration or averaging, yielding a first combined CCF portion. In step 706, the propagation delay associated with the received SDSS that was spread with said first code and transmitted by a first transmitter is determined from the position of the auto-correlation peak within said first combined CCF portion. Afterwards, in a step 707, the code index i is increased by one, and the steps 702 to 707 are repeated in order to determine the delays associated with the received SDSS that was spread with a second code, and so forth.

Figure 8:
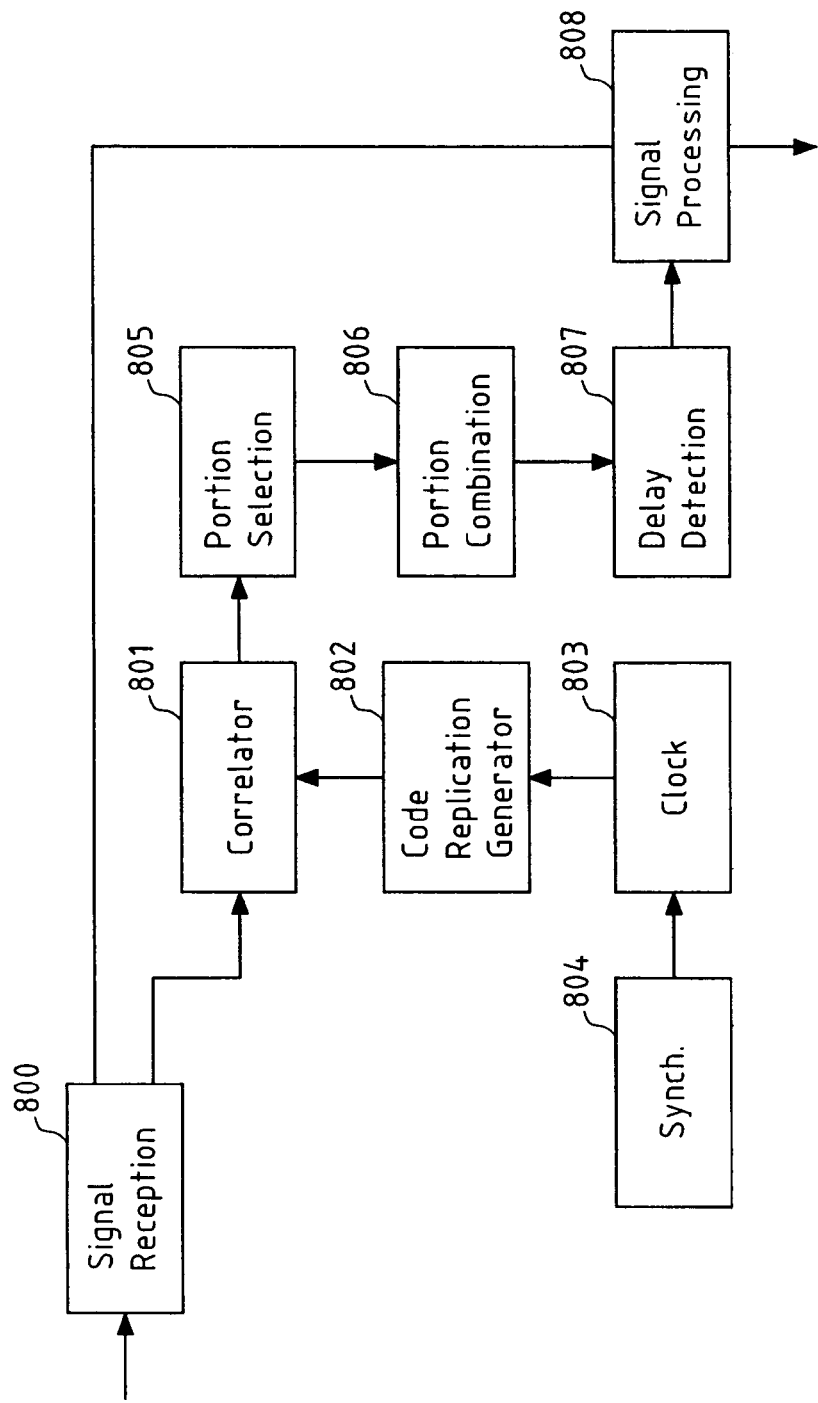
FIG. 8: a schematic illustration of a device according to the present invention.

FIG. 8 finally is a schematic illustration of a device according to the present invention. Said device comprises a signal reception instance 800, wherein amplification, demodulation (if necessary), pulse-shape matched filtering, equalization and sampling may be performed. The signal reception instance 800 outputs a signal that comprises a couple of received SDSS to a correlator 801. The correlator is fed with code replicas by a code replica generator 802, which is triggered by a clock 803, which in turn is controlled by a synchronization unit 804. The synchronization unit 804 ensures that the clock 803 of the device is synchronized with the universal time that is used by the transmitters. The correlator 801 correlates said signal with a code replica from said code replica generator 802 and outputs a CCF or portions thereof to a portion selection unit 805. In this unit, portions of the CCF that are suited for combination are selected or determined and then fed into a portion combination unit 806. In this unit, the actual combination of at least two portions of a CCF is performed by means of averaging or integrating. The resulting combined CCF portion then is handed to a delay detection unit that determines the delay on the delay axis of the combined CCF portion for which an auto-correlation peak is encountered. This delay may be forwarded to a signal processing instance 808, which may as well receive said signal comprising a couple of received SDSS from the signal reception instance 800 and process the actual information of the data symbol stream. Both said information and the delay may be further processed by said signal processing unit for determining the position of the device.

The invention has been described above by means of preferred embodiments. It should be noted that there are alternative ways and variations which are obvious to a skilled person in the art and can be implemented without deviating from the scope and spirit of the appended claims. In particular, the present invention is by no means restricted to a GNSS such as GPS or Galileo, but is applicable in any CDMA system, for instance in CDMA mobile communication systems. The combination of several portions of the CCF does not necessarily have to be performed in a receiver, but can also be performed in an outside network. The results may then be forwarded to the receiver or to the transmitters to increase the accuracy of the system. It should be noted that the difference between the number of chips of two codes does not necessarily have to be an integer number of chips, also fractional numbers of chips are possible. Furthermore, apart from the fact that phase modulation of the spread data symbol streams may not be mandatory at all, further types of modulation techniques such as frequency or amplitude modulation may be applied.

The invention as presented in this specification allows for a fast and computationally efficient acquisition as compared to prior art systems. The reduction of the cross-correlation is even larger as in a system that uses longer codes. The reduction in coding or spreading gain that results from the reduction of the length of the code by a couple of chips (for instance in the order of some tens, if one length for each satellite is desired) is insignificant as compared to the overall code length, which is of the order 1000 in a GPS system and of the order 10000 in the Galileo system. Frame synchronization between the transmitted frames of several transmitters can be made feasible by choosing the codes so that the frame length in chips equals the least common multiple of all code lengths in the system. Code length reuse is possible, e.g. for satellites that are known to be on opposite sites of the orbit. To allow for a constant data symbol rate and to combat jamming, periodic changing of the codes is possible. The method according to the present invention breaks the limitation of a communication system that the length of all codes has to be equal and thus contributes to rendering the deployed communication signals similar to noise signals. According to Shannon's information theory, the method according to the present invention thus may contribute to further approach Shannon's channel capacity limit.

The invention claimed is:

1. A method for determining a delay of a spread data symbol stream, comprising the steps of:
   at least partially correlating a signal, which comprises at least first and second spread data symbol streams that are obtained by spreading at least a first and second data symbol stream with a respective first and second code, with said first code to obtain at least two portions of a cross-correlation function between said signal and said first code, and
   combining said at least two portions of said cross-correlation function to obtain a combined cross-correlation function portion from which a first delay of said first spread data symbol stream is determined,
wherein said first code and said second code are composed of chips and wherein the number of chips of said first code is different from the number of chips of said second code, wherein said signal is a receive signal comprising the superposed spread data symbol streams that have been transmitted by satellite transmitters and received at a receiver with respective propagation delays, wherein said propagation delays are indicative of the distance between said receiver and said respective satellite transmitters, and wherein said determined first delay is one of said propagation delays.

2. The method according to claim 1, wherein said step of combining said at least two portions of said cross-correlation function comprises the step of averaging said at least two portions of said cross-correlation function or integrating said at least two portions of said cross-correlation function.

3. The method according to claim 1, wherein the number of chips of said first code and the number of chips of said second code are not multiples of each other.

4. The method according to claim 1, wherein the chip rates of said at least first and second spread data symbol streams are equal.

5. The method according to claim 1, wherein N chips of said at least first and second spread data symbol stream are contained in a frame, respectively, and wherein N is the least common multiple of the number of chips of said first code and the number of chips of said second code.

6. The method according to claim 1, wherein said first code and second code are software codes and/or pseudo-random noise codes.

7. The method according to claim 1, wherein said first code and second code are taken from the same basic code and only differ in the number of chips.

8. The method according to claim 1, wherein said signal further comprises a third spread data symbol stream that is obtained by spreading a third data symbol stream with a third code, wherein said third code is composed of chips and wherein the number of chips of said third code is equal to the number of chips of said first code or to the number of chips of said second code.

9. The method according to claim 1, wherein said first and second codes are time-invariant.

10. The method according to claim 1, wherein said first and second codes are changed in certain intervals.

11. The method according to claim 10, wherein said first and second codes are periodically changed so that the average number of chips in said respective first and second code is equal.

12. The method according to claim 1, wherein said satellite transmitters are satellite transmitters of a Global Navigation Satellite System (GNSS).

13. A computer program product comprising a computer program with instructions stored in a readable memory, the instructions operable to cause a processor to perform the method steps of claim 1.

14. A device for determining a delay of a spread data symbol stream, comprising:
  means for at least partially correlating a signal, which comprises at least first and second spread data symbol streams that are obtained by spreading at least a first and second data symbol stream, with a respective first and second code with said first code to obtain at least two portions of a cross-correlation function between said signal and said first code, and
  means for combining said at least two portions of said cross-correlation function to obtain a combined cross-correlation function portion from which a first delay of said first spread data symbol stream is determined, wherein said first code and said second code are composed of chips and wherein the number of chips of said first code is different from the number of chips of said second code.

15. A system, comprising:
  at least a first and a second transmitter, for transmitting respective first and second spread data symbol streams that are obtained by spreading at least a respective first and second data symbol stream with a respective first and second code, wherein said first code and said second code are composed of chips and wherein the number of chips of said first code is different from the number of chips of said second code, and
  at least one receiver for receiving a signal comprising at least said respective first and second spread data symbol streams, wherein said data streams are received at the at least one receiver with respective propagation delays, wherein said propagation delays are indicative of the distance between said at least one receiver and said first and second transmitters, wherein said receiver at least partially correlates said signal with said first code to obtain at least two portions of a cross-correlation function between said signal and said first code, and wherein said receiver combines said at least two portions of said cross-correlation function to obtain a combined cross-correlation function portion from which a first delay of said first spread data symbol stream is determined, wherein said first delay is one of said propagation delays.

16. A device for determining a delay of a spread data symbol stream, comprising:
  a correlator for at least partially correlating a signal, which comprises at least first and second spread data symbol streams that are obtained by spreading at least a first and second data symbol stream, with a respective first and second code with said first code to obtain at least two portions of a cross-correlation function between said signal and said first code, and
  a combination unit for combining said at least two portions of said cross-correlation function to obtain a combined cross-correlation function portion from which a first delay of said first spread data symbol stream is determined,
wherein said first code and said second code are composed of chips and wherein the number of chips of said first code is different from the number of chips of said second code.

* * * * *